United States Patent [19]
Nilsson

[11] 3,750,264
[45] Aug. 7, 1973

[54] METHOD OF MANUFACTURING ROD, WIRE OR TUBE SHAPED PRODUCTS OF COMPOUND MATERIAL BY MEANS OF HYDROSTATIC EXTRUSION

[75] Inventor: Jan Nilsson, Robertsfors, Sweden

[73] Assignee: Allmanna Svenska Elektriska Aktiebolaget, Vastera, Sweden

[22] Filed: Feb. 10, 1972

[21] Appl. No.: 225,077

[30] Foreign Application Priority Data
Mar. 10, 1971 Sweden .............................. 3048/71

[52] U.S. Cl. .................... 29/474.3, 29/475, 29/494, 29/504, 72/60, 72/258
[51] Int. Cl. ........................................... B21c 23/22
[58] Field of Search ..................... 72/60; 29/474.3, 29/475, 494, 504

[56] References Cited
UNITED STATES PATENTS
3,631,586  1/1972  Bearpack et al ................... 29/474.3
3,620,059  11/1971 Nilsson ............................... 72/60

Primary Examiner—Richard J. Herbst
Attorney—Jennings Bailey, Jr.

[57] ABSTRACT

For manufacturing rod, wire or tube-shaped products of compound material, a billet which is composed of a core and a casing, of different materials, selected from aluminum and cooper and their alloys, is hydrostatically extruded through a die. Either the core or the casing or both at their facing surfaces have an amount of oxides thereon which is substantially less than the amount required to form a continuous layer of molecular thickness when the billet is extruded with a selected extrusion ratio.

3 Claims, 1 Drawing Figure

PATENTED AUG 7 1973                                    3,750,264
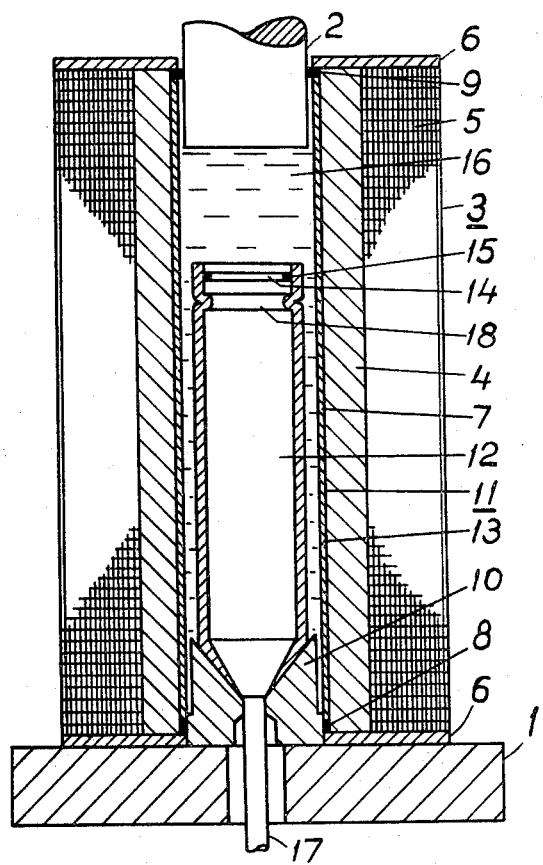

METHOD OF MANUFACTURING ROD, WIRE OR TUBE SHAPED PRODUCTS OF COMPOUND MATERIAL BY MEANS OF HYDROSTATIC EXTRUSION

BACKGROUND OF THE INVENTION

1. Field of the Invention

The present invention relates to a method of manufacturing rod, wire or tube shaped products of compound material having an inner body, in the following called core, and a casing surrounding the inner body by means of hydrostatically extruding a billet comprising a core and a tube surrounding the core, which at least at one end of the billet are joined together in a liquid-tight manner, so that when the billet is extruded, the pressure medium used is prevented from penetrating between the core and the casing. The billet is placed in a pressure chamber and extruded by the influence of the pressure in a surrounding pressure medium, out through a die having an opening the same shape as the desired cross-section of the product. In the product the core and casing may consist of aluminum or an aluminum alloy and copper, a copper alloy or another aluminum alloy.

2. The Prior Art

A method of hydrostatically extruding compound products is described in detail in prior applications of Burstrom, Ser. No. 32,195, filed Apr. 27, 1970 and Nilsson, Ser. No. 758,308, filed Sept. 9, 1968. It has been cOnsidered extremely important that the outer surface of the core and the inner surface of the casing which are to be joined during the extrusion process by means of cold-welding, pressure and deformation while being extruded through the die opening, must be very well cleaned and all traces of oxide removed. The removal of the oxide layer has by some been considered so important that the oxide layer on the core has been removed in an inert gas atmosphere so that another oxide layer will not be produced immediately because of the presence of oxygen in the surrounding atmosphere. The billet is also assembled in an inert gas atmosphere and sealed at both ends to prevent oxygen from penetrating into the gap between the core and the surrounding casing prior to the extrusion process.

SUMMARY OF THE INVENTION

According to the present invention, an oxide layer is provided on one or both of the mating surfaces of the core and the casing.

An oxide layer is formed extremely rapidly on an aluminum surface which is exposed to oxygen. According to information in literature concerning the art, a 10 A thickness of oxide is produced in only a few minutes (according to other information an oxide layer is produced in fractions of seconds) and then increases slowly in a dry atmosphere and may reach a thickness of 50 – 100 A after a few months, 15 – 25 A according to other information. The rate and tendency to oxide formation depends very much on the humidity of the air, the temperature when the body is first formed, and other factors. Contrary to expectations, it has been found possible when manufacturing compound products comprising a core of aluminum or an aluminum alloy and a casing of copper, a copper alloy or an aluminum alloy, or the other way round, to achieve an entirely satisfactory bond between the material in the casing and that in the core when using inner or outer bodies in the billet of aluminum with a layer of aluminum oxide of a thickness which would take several months of storage in normal atmosphere to form. One explanation of this is that with sufficiently great deformation the oxide layer is broken down so that between small islands of oxide large surfaces of clean aluminum are pressed against clean material in the other material in the compound product. If there is sufficient deformation, the contact surface between the casing and the core will be enlarged to such an extent that the amount of oxide is substantially less than is necessary to form an oxide layer of molecular thickness, about 3 A. In order to cover the whole contact surface, therefore, the oxide layer would have to be thinned out to far below the molecular thickness, which is theoretically impossible.

BRIEF DESCRIPTION OF THE DRAWINGS

The invention will be described in more detail with reference to the accompanying drawings. The FIGURE shows schematically a section through a pressure chamber during extrusion of a billet.

DESCRIPTION OF THE PREFERRED EMBODIMENTS

In the drawings, 1 designates a press stand and 2 a pressure-generating plunger arranged in an hydraulic press, not otherwise shown, in which there is a cylinder for operation of the plunger 2. The pressure chamber includes a high pressure cylinder 3 constructed of a steel cylinder 4, a strip mantle 5 of a rectanglar high-strength strip metal wound on under pre-stressing, and end pieces 6. Between the end pieces 6 and a spacer 7, sealing rings 8 and 9 are arranged to provide seals between the cylinder 4 and the extrusion die 10 and the piston 2, respectively. In the pressure chamber is a billet 11 comprising a core 12 of aluminum or an aluminum alloy and a casing 13 of copper or a copper alloy surrounding the core. At the inner end of the billet there is an annular groove 14 in the core in which lies a ring 15 which prevents the pressure medium 16 from penetrating between the core and the casing. In this way the surfaces are kept free from contamination and a high pressure is obtained between the core and the casing, which gives good adhesion. The adhesion can be further improved by providing the core !2 with an additional groove 18. An extruded bar is designated 17.

Before the assembly of the billet 11, the outer surface of the core 12 and the inner surface of the casing 13, are cleaned in such a way that grease, oil and other impurities upon the surfaces and loose oxide scales are removed, but oxides which are bonded to the underlying metal are not removed. The cleaning is carried out by washing the core and the casing with grease-dissolving agents normally used for degreasing products.

The core and casing are then combined to form a billet. The billet obtained in this way is extruded with an extrusion ratio exceeding 20:1, preferably exceeding 50:1. It has been found that an extrusion ratio of 20:1 may give acceptable bonding but that it is desirable to extrude compound products with oxides layers remaining on the initial aluminum material at considerably higher extrusion ratios in order to ensure that a completely satisfactory result is obtained in normal industrial production, in spite of the usual variations in working conditions. If the extrusion ratio is increased still further, for example to 150:1, the bond will be even more intimate and reliable. The lowest extrusion ratio which can be used depends to a certain extent on the corss-section of the product. When producing rectangular bars for switchgear, which need not be machined by drawing to smaller sections, satisfactory bonding can be obtained with a smaller extrusion ratio than for circular wires or rods which are to be drawn in many stages to produce a thin wire. In the latter case it is not suitable to use an extrusion ratio of less than 30:1.

For solid cores of aluminum a continuously cast cylindrical billet is a suitable starting product. The casting surface with any damage and thick oxides layers formed by heat and moisture are removed by turning, after which the aluminum billets can be stored until they are to be used. Only then, just before being put together with a tube of aluminum or copper to form a compound billet, need they be cleaned with a fat-dissolving agent such as trichloroethylene, alcohol or the like. In certain cases it may be necessary to brush the cores with a steel brush in order to remove loose matter or very thick oxide layers which may have been formed if the storage conditions are unfavorable. Experiments have shown that billets having a core consisting of a cylinder of aluminum, turned at the surface, which has been stored more than two months in normal workshop atmosphere and washed with trichloroethylene, and a casing of copper, have obtained a satisfactory bond at an extrusion ratio of 50:1 and that a perfect bond has been obtained with an extrusion ratio of 150:1. Experiments have shown that storages times between 10 minutes and 2.5 months between turning and washing in trichloroethylene do not have any noticeable influence on the bond. However, with extrusion ratios as low as 3.3:1 (70 percent area reduction) no bond is obtained at all. The copper casing is soft-annealed and de-fatting is thus obtained automatically. Upon cooling most of the oxide layer on the surface of the tube loosens and falls off. However, the copper casing may also be washed with a grease-dissolving agent such as trichloroethylene or the like. The inner surface of the copper casing need not always be cleaned of copper oxide either. A metallurgical bond in the boundary layer can be obtained even if this and/or some other cleaning is not performed in connection with the extrusion process.

I claim:

1. Method of manufacturing rod, wire or tube shaped products of compound material from a billet comprising an inner body and an outer body, one of the bodies being formed of a material consisting essentially of aluminum and the other body of a material consisting essentially of a substance of the group aluminum and copper, the materials of the two bodies being different, by means of hydrostatic extrusion of a billet having a core forming the inner body and a casing forming the outer body, which at least at one end of the billet are joined together in a liquid-tight manner, so that, when the billet is extruded through a die in a pressure chamber, surrounding pressure medium is prevented from penetrating between the core and the casing, at least one of the bodies having an oxide layer of at least molecular thickness at the adjacent surfaces of the bodies, which comprises hydrostatically extruding the billet with an extrusion ratio of such a size that the amount of oxides on the adjacent surfaces between the materials of the two bodies is substantially less than the amount required to form a layer of molecular thickness, whereby the oxides are broken down and a metallurgical bond is obtained.

2. Method according to claim 1, in which the extrusion ratio exceeds 20:1.

3. Method according to claim 1, which comprises cleaning the contact surfaces of the core and casing with a grease-dissolving medium.

* * * * *